(12) United States Patent
Lin et al.

(10) Patent No.: US 11,585,061 B2
(45) Date of Patent: Feb. 21, 2023

(54) LARGE TIDAL CURRENT ENERGY GENERATING DEVICE AND ASSEMBLY PLATFORM THEREOF

(71) Applicants: HANGZHOU LHD INSTITUTE OF NEW ENERGY, LLC, Hangzhou (CN); ZHEJIANG ZHOUSHAN LHD ENERGY DEVELOPMENT CO., LTD., Zhoushan (CN); HANGZHOU LINDONG NEW ENERGY TECHNOLOGY INC., Hangzhou (CN)

(72) Inventors: Enle Lin, Hangzhou (CN); Fuwei Zhu, Hangzhou (CN); Anpeng He, Hangzhou (CN); Hongyue Tian, Hangzhou (CN); Enjia Xu, Hangzhou (CN)

(73) Assignees: HANGZOU LHD INSTITUTE OF NEW ENERGY, LLC, Hangzhou (CN); ZHEJIANG ZHOUSHAN LHD ENERGY DEVELOPMENT CO., LTD., Zhoushan (CN); HANGZHOU LINDONG NEW ENERGY TECHNOLOGY INC., Hangzhou (CN)

(*) Notice: Subject to any disclaimer, the term of this patent is extended or adjusted under 35 U.S.C. 154(b) by 0 days.

(21) Appl. No.: 17/684,932

(22) Filed: Mar. 2, 2022

(65) Prior Publication Data

US 2022/0186452 A1 Jun. 16, 2022

Related U.S. Application Data

(63) Continuation of application No. PCT/CN2021/099288, filed on Jun. 10, 2021.

(30) Foreign Application Priority Data

Jun. 10, 2020 (CN) .......................... 202010524258.7

(51) Int. Cl.
*E02B 9/08* (2006.01)
*F03B 13/26* (2006.01)
(Continued)

(52) U.S. Cl.
CPC ............ *E02B 9/08* (2013.01); *E02B 17/0017* (2013.01); *F03B 13/10* (2013.01); *F03B 13/264* (2013.01);
(Continued)

(58) Field of Classification Search
CPC .... E02B 9/08; E02B 2017/0056; F03B 13/26; F03B 13/264
(Continued)

(56) References Cited

U.S. PATENT DOCUMENTS

2009/0162144 A1* 6/2009 Ayre ........................ F03B 13/12
405/76
2010/0148513 A1* 6/2010 Susman ................ F03B 13/264
290/54
(Continued)

FOREIGN PATENT DOCUMENTS

AU 2015370949 A1 * 7/2017 ........... B63B 35/003
CN 103821117 A 5/2014
(Continued)

*Primary Examiner* — Frederick L Lagman
(74) *Attorney, Agent, or Firm* — Muncy, Geissler, Olds & Lowe, P.C.

(57) ABSTRACT

The present invention provides an assembly platform of a large tidal current energy generating device. The assembly platform is internally provided with at least one horizontal axis hydro-generator. The assembly platform includes supports, at least four fixed piles, at least two sleeving members and at least two force-bearing supports. The fixed piles are
(Continued)

connected through the supports to form an installation space. The hydro-generator is installed inside the installation space, one end of each fixed pile is driven to be fixed to a seabed and the other end extends to be above a water surface. Ends of the at least two force-bearing supports are respectively mounted on the left and right sides of the horizontal axis hydro-generator along the water flow direction and the other ends are respectively provided with corresponding sleeving members so as to resist an impact force of a water flow on the horizontal axis hydro-generator.

18 Claims, 3 Drawing Sheets

(51) Int. Cl.
  *E02B 17/02* (2006.01)
  *E02B 17/00* (2006.01)
  *F03B 13/10* (2006.01)
(52) U.S. Cl.
  CPC ... *E02B 2017/0056* (2013.01); *F05B 2240/97* (2013.01)
(58) Field of Classification Search
  USPC ...................................................... 405/75, 76
  See application file for complete search history.

(56) References Cited

U.S. PATENT DOCUMENTS

| | | | | |
|---|---|---|---|---|
| 2011/0298216 A1* | 12/2011 | Ives | ...................... | F03B 13/264 |
| | | | | 29/428 |
| 2013/0243527 A1* | 9/2013 | Ayre | ...................... | F03B 17/061 |
| | | | | 405/76 |
| 2013/0333371 A1* | 12/2013 | Vigars | ...................... | F03B 13/10 |
| | | | | 405/203 |
| 2015/0316021 A1* | 11/2015 | Dunne | ...................... | F03B 13/10 |
| | | | | 405/203 |
| 2016/0138554 A1* | 5/2016 | Hawthorne | ............. | F03B 3/128 |
| | | | | 29/889.1 |
| 2018/0009512 A1* | 1/2018 | Dunne | .................. | B63B 35/003 |

FOREIGN PATENT DOCUMENTS

| | | | | | |
|---|---|---|---|---|---|
| CN | 105221332 A | | 1/2016 | | |
| CN | 105298715 A | * | 2/2016 | ............. | F03B 13/00 |
| CN | 105401564 A | | 3/2016 | | |
| CN | 107110107 A | | 8/2017 | | |
| CN | 110485459 A | * | 11/2019 | | |
| CN | 111622889 A | | 9/2020 | | |
| CN | 212318209 U | | 1/2021 | | |
| CN | 212318210 U | | 1/2021 | | |
| CN | 113775465 A | * | 12/2021 | ............. | F03B 13/00 |
| GB | 2560057 B | | 6/2019 | | |
| KR | 101022045 B1 | * | 3/2011 | | |
| KR | 20110107887 A | * | 10/2011 | | |
| WO | WO-2017/045030 A1 | | 3/2017 | | |

\* cited by examiner

LARGE TIDAL CURRENT ENERGY GENERATING DEVICE AND ASSEMBLY PLATFORM THEREOF

CROSS REFERENCE TO RELATED APPLICATIONS

This application is a Continuation of co-pending Application No. PCT/CN2021/099288, filed on Jun. 10, 2021, for which priority is claimed under 35 U.S.C. § 120; and this application claims priority of Application No. 202010524258.7 filed in China on Jun. 10, 2020 under 35 U.S.C. § 119, the entire contents of all of which are hereby incorporated by reference.

TECHNICAL FIELD

The present invention belongs to the field of tidal current energy power generation, in particular to a large tidal current energy generating device and an assembly platform thereof.

BACKGROUND

Ocean energy (including tidal current energy, wave energy, temperature difference energy, salinity gradient energy, ocean current energy and the like) is a clean and pollution-free renewable energy source featuring in rich reserve, wide distribution and extremely good development prospect and value. Nowadays, with increasingly short of energy sources and increasingly severe greenhouse effect, it is necessary for energy sources to be low-carbon, so that clean energy sources such as wind energy and ocean energy are a development direction of future energy sources. However, besides wind energy which is utilized maturely by a power generation device for these clean energy sources, utilization of ocean energy is still in a starting stage without universal and mature devices, so that the power generation power is lower compared with that of other energy sources. Most important, the manufacturing cost, the mounting cost or the maintenance cost of an existing ocean energy power generation apparatus are far higher than the cost of other energy source power generation, which becomes the largest obstacle that restrains commercial application and popularization of the ocean energy power generation apparatus.

At present, the single installed power of a wind power generation apparatus that generates power by using offshore wind power may reach 5 MW to the maximum extent. It is structured such that a tower is fixed to a seabed, and then a wind driven generator is fixed to the top end of the tower and is located above a sea level to collect wind power to generate electricity. The diameter of the lowest end of the tower is 6.242 m, the diameter of the uppermost end of the tower is 4.170 m, the tower diameter is averagely 5.206 m, and the whole tower is 96 m tall. In other words, in order to make the single installed power reach 5 MW, it is necessary to arrange a tower that is nearly 100 m tall, and the generator with the power may be carried when the maximum diameter is greater than 6 m. Such a tower is 439 tons heavy, and the cost and the mounting fee are high. As a result of the high cost, it may not be converted into true economic value. Even if it is to be applied on a large scale, it is further discouraged from the high cost.

By adopting wind power generation, the diameter of the whole impeller, even if 230 m, it just has the generating capacity of 12 MW, but the corresponding tower height needs to be 195 m (the lowest end of a blade is 30 m from the ground and the radius of the impeller is 165 m). However, if tidal current energy is utilized to generate electricity, the diameter of the blade is just 70 m, and the generating capacity of 30 MW may be reached theoretically. The height of a pile is just 40 m (the blade is 5 m from the ground, and the radius of the impeller is 35 m). Thus, compared with offshore wind power generation, tidal current energy generation reduces the height of the tower drum and lowers the cost, and the power generation efficiency by utilizing the tidal current energy is far higher than that of power generation by offshore wind energy.

A conventional tidal current energy power generation apparatus usually has two fixing modes: floating fixation, namely, it floats in the sea through a floating bed or is fixed to the seabed or both sides through steel ropes; and seabed fixation, namely, it is directly fixed to the seabed through a fixed pile. As floating fixation still generates electricity by utilizing wave energy, and compared with low generating capacity by tidal current energy at depth, the scale of the generator capable of suspending is very small, the economic value is small and it is gradually abandoned in actual use. The second seabed fixing mode is a fixing mode used by the existing tidal current energy power generation apparatus put into actual use.

At present, the maximum single installed power of a power generation module of the existing tidal current energy power generation apparatus put into use actually is 2 MW. Up to now, there are no successfully implemented cases with the single installed power exceeding 2 MW in the world. Limited by the scale of the single power generation unit, most tidal current energy power generation apparatuses are extremely high in cost and may not be put into commercial use truly, so that commercial value may not be generated. Specifically speaking, the conventional tidal current energy power generation apparatus is similar with an offshore wind power generation apparatus, and is directly fixed to seabed through a fixed pile, too. As seawater is huge in impact force, the fixed pile must have an enough large diameter to resist a moment. The piling cost is higher if the diameter of the fixed pile is greater. As tolerance of a fixed pile with a specific diameter has an upper limit value, it only can bear the horizontal axis hydro-generator within a certain scale correspondingly. Regardless of cost and technical angle, the fixed pile may not be amplified without limit, so that the installed power of the single horizontal axis hydro-generator may not be broken through.

SUMMARY

In order to overcome at least one deficiency in the prior art, the present invention provides a large tidal current energy generating device and an assembly platform thereof.

In a first aspect, the present invention provides an assembly platform of a large tidal current energy generating device. The assembly platform is internally provided with at least one horizontal axis hydro-generator. The assembly platform of the large tidal current energy generating device includes supports, at least four fixed piles, at least two sleeving members and at least two force-bearing supports. The at least four fixed piles are connected through the supports to form an installation space. The at least one horizontal axis hydro-generator is installed inside the installation space, one end of each of the fixed piles is driven to be fixed to a seabed and the other end of each of the fixed piles extends to be above a water surface, the at least four fixed piles are arranged in left and right columns along a water flow direction, at least two fixed piles in each column are arranged in sequence along the water flow direction, and at least one fixed pile of the at least two fixed piles in each column acts as a main bearing pile. The at least two sleeving members are detachably sleeved on the main bearing piles on left and right sides of the at least one horizontal axis hydro-generator and are located below the water surface, respectively. Ends of the at least two force-bearing supports are respectively mounted on the left and right sides of the at least one horizontal axis hydro-generator along the water flow direction and other ends of the at least two force-bearing supports are respectively provided with corresponding sleeving members so as to resist an impact force of a water flow on the at least one horizontal axis hydro-generator.

In an embodiment of the first aspect of the present invention, the assembly platform further includes at least two groups of barrier guide slots for mounting or fixing barriers, the at least two groups of barrier guide slots are respectively arranged on upstream and downstream sides of the at least one horizontal axis hydro-generator, and each group of the barrier guide slots is led to a position below the water surface from a position above the water surface.

In an embodiment of the first aspect of the present invention, the assembly platform further includes at least one personnel passage, and one end of the at least one personnel passage is led to a position above the water surface and the other end thereof is led to a position below the water surface, so that a person may arrive at the position below the water surface to mount and fix the main bearing piles and the sleeving members.

In an embodiment of the first aspect of the present invention, the assembly platform further includes at least one air blower and a ventilation duct. The ventilation duct is fixedly or detachably arranged along an inner side of the personnel passage or an outer side of the personnel passage, and the ventilation duct passes from a position above the water surface to a position below the water surface to enable air in a working area to be exchanged under the water surface.

In an embodiment of the first aspect of the present invention, the assembly platform further includes at least one water pump and at least one drain pipe. The at least one drain pipe is fixedly or detachably arranged along the inner side of the personnel passage or the outer side of the personnel passage, the at least one drain pipe passes from a position above the water surface to a position below the water surface, such that the water pump pumps accumulated water in the working area under the water surface to discharge the water to be above the water surface by the drain pipe.

In an embodiment of the first aspect of the present invention, concrete is poured into a lower portion of the main bearing pile, and an upper portion of the main bearing pile is hollow, so that people may arrive a position below the water surface through the main bearing pile to mount and fix the main bearing pile and the sleeving members.

In an embodiment of the first aspect of the present invention, the assembly platform further includes at least one suspending support, the suspending support is an airtight hollow structure, and one end of the suspending support is communicated with the horizontal axis hydro-generator, so that people enters into the horizontal axis hydro-generator through the suspending support, and the other end of the suspending support is led to a position above the water surface.

In an embodiment of the first aspect of the present invention, the assembly platform further includes a sealing device and a fixing assembly. The fixing assembly is configured to fix the main bearing piles and the sleeving members, and the sealing device is correspondingly disposed at the fixing assembly.

In an embodiment of the first aspect of the present invention, the assembly platform further includes at least two shock absorbers, and each of the shock absorbers is arranged between the sleeving member and the main bearing pile.

In an embodiment of the first aspect of the present invention, a side of each column of the fixed columns facing the horizontal axis hydro-generator is provided with a side plate.

In a second aspect, the present invention further provides a large tidal current energy generating device, including the assembly platform according to any one embodiment in the first aspect, at least one horizontal axis hydro-generator and at least one suspending support. The at least one horizontal axis hydro-generator is separably installed inside the assembly platform. The at least one suspending support is of an airtight hollow structure, and one end of the suspending support is communicated with the horizontal axis hydro-generator, so that people can enter into the horizontal axis hydro-generator through the suspending support and the other end of the suspending support is led to a position above the water surface.

In a third aspect, the present invention further provides a tidal current energy power generation apparatus, including at least two barriers which are respectively arranged on upstream and downstream sides of the horizontal axis hydro-generator, a width of each of the barriers along a water flow direction being greater than or equal to 8 cm.

In an embodiment of the third aspect of the present invention, the tidal current energy power generation apparatus includes the assembly platform according to any one embodiment in the first aspect.

In an embodiment of the third aspect of the present invention, the tidal current energy power generation apparatus uses the current energy power generation apparatus according to any one embodiment in the second aspect.

To sum up, according to the present invention, the four fixed columns and the supports are connected together to form the installation space, and then the horizontal axis hydro-generator is fixed in the installation space instead of being installed inside a frame in the prior art, so that use of steel is reduced greatly, and the manufacturing and mounting costs are lowered. Furthermore, by arranging the force-bearing supports and the sleeving members on two sides of the horizontal axis hydro-generator, a thrust of the horizontal axis hydro-generator subject to the water flow may be transferred to two sides in a balanced manner, so that the thrust is dispersed to the whole assembly platform, and therefore, the whole assembly platform may bear a single horizontal axis hydro-generator with a higher power, thereby, the power generation cost of the tidal current energy power generation apparatus is lowered greatly. In particular, the horizontal axis hydro-generator of the present invention has a fixed point in water, so that a problem that the horizontal axis hydro-generator is easily damaged due to a resonance phenomenon as a result of swing under the action of the huge thrust of the water flow in the prior art. By adopting the large tidal current energy generating device and the assembly platform thereof provided by the embodiments, the tidal current energy power generation cost may be lowered to be lower than the thermal power generation cost truly, so that commercial popularization and application of tidal current energy power generation are realized truly.

DETAILED DESCRIPTION OF THE INVENTION

Figure 1:
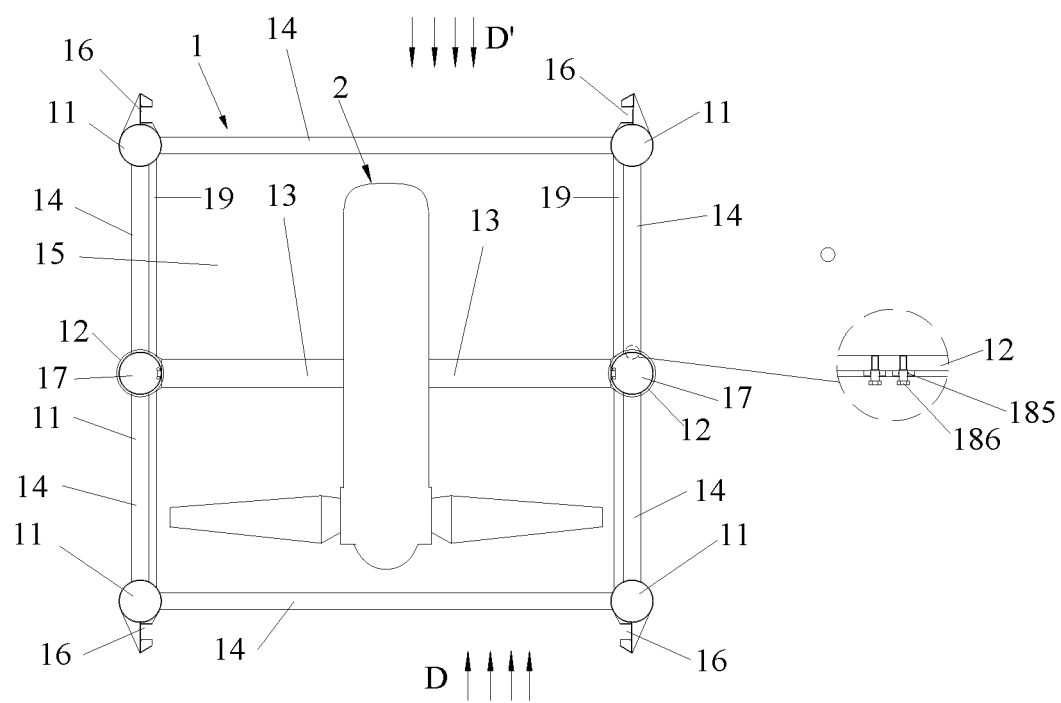
FIG. 1 is a top view of a large tidal current energy generating device provided according to a first embodiment of the present invention.
Figure 2:
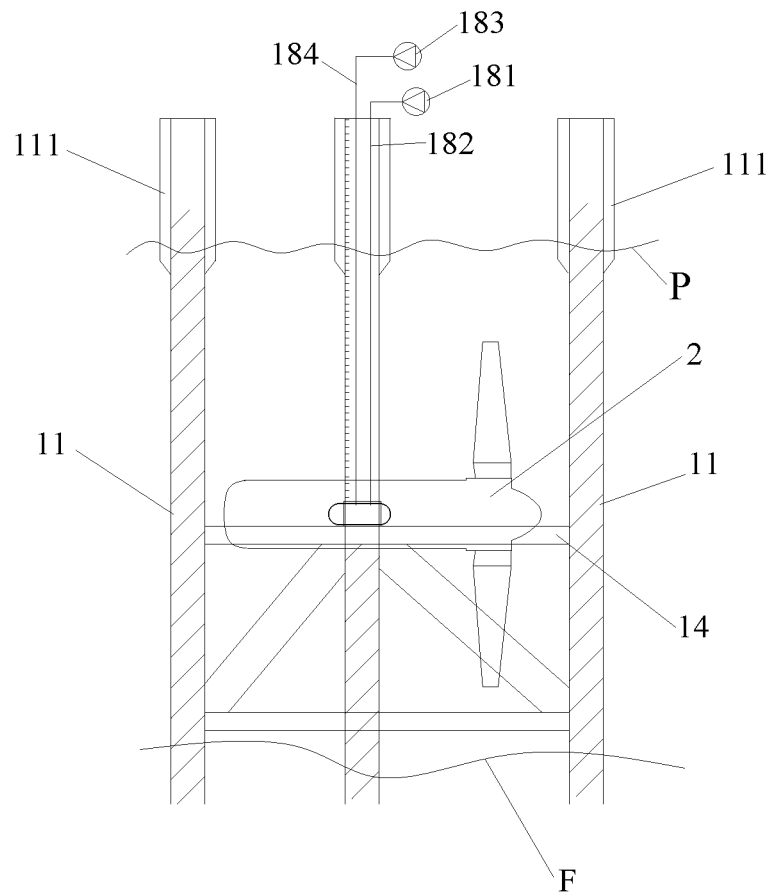
FIG. 2 is a side view of the large tidal current energy generating device provided according to the first embodiment of the present invention.

FIG. 1 is a top view of a large tidal current energy generating device provided according to a first embodiment of the present invention. FIG. 2 is a side view of a large tidal current energy generating device provided according to a first embodiment of the present invention. A right dotted line circle in FIG. 1 is an enlarged schematic diagram of an identifier of a left dotted line circle. As shown in FIG. 1 and FIG. 2, in a first embodiment, a large tidal current energy generating device includes an assembly platform 1 and at least one horizontal axis hydro-generator 2, and the at least one horizontal axis hydro-generator 2 is installed inside the assembly platform 1.

In the embodiment, the assembly platform 1 includes at least four fixed piles 11, at least two sleeving members 12, at least two force-bearing supports 13 and supports 14. One end of each of the fixed piles 11 is driven to be fixed to a seabed F and the other end of the fixed pile extends to be above a water surface P. The at least four fixed piles 11 are connected integrally through the supports 14, and the four fixed piles 11 together with the supports 14 enclose to form an installation space 15. The at least four fixed piles 11 are arranged in left and right columns along a water flow direction D, and each column of at least two fixed piles 11 is arranged successively along the water flow direction D. Specifically speaking, the at least four fixed piles 11 are divided into two groups (two columns), and each group includes at least two fixed piles 11. A line by connecting cross sections of the at least two fixed pile 11 in each group through a center point is parallel to the water flow direction D substantially (a slight deviation is allowed). As each group of fixed piles 11 is arranged in a column parallel to the water flow direction D, the impact force of the water flow acted to the downstream fixed pile 11 is greatly reduced after being blocked by the upstream fixed pile 11. As shown in FIG. 1, in a raising tide, the water flow direction is D and in a falling tide, the water flow direction is turned to D'. "Left" and "right" herein are left and right sides relative to the water flow direction. Specifically speaking, viewed from the direction shown in FIG. 1, namely, viewed from the top of the water surface, the two columns of fixed piles 11 are respectively located on the left side and the right side.

In the embodiment, the supports 14 includes a plurality of rigid rod pieces, and each of the rigid rod pieces is connected with two fixed piles 11. A force sustained by the whole assembly platform 1 is transferred between the fixed piles 11 via the supports 14 to be decomposed. By arranging the supports 14, the at least four fixed piles 11 together form a whole, and a force sustained by the single fixed pile 11 may be transferred to other fixed piles 11 effectively, so that stress of the whole assembly platform 1 is arranged in a balanced manner. In the embodiment, an underwater portion and an above-water portion of the fixed pile 11 are provided with the supports 14 to connect. When a sea area of the tidal current energy power generation apparatus is relatively deep, the fixed piles 11 are relatively long, the plurality of supports 14 may be arranged underwater, and thus, the fixed piles 11 may be connected more firmly, and therefore, the force is dispersed more effectively. However, it is not defined in the present invention, and the connecting positions and connecting quantity of the supports 14 may be arranged according to specific demands.

In an actual application, each of the fixed piles 11 is unnecessarily mounted completely perpendicular to the seabed F. In the embodiment, the fixed piles 11 located on a water side or a falling side (the lowest side and the uppermost side shown in FIG. 1) may be inserted into the seabed F obliquely. The capacity of each of the obliquely inserted fixed piles 11 to resist the impact force of the water flow is about 1.5 times of that of the perpendicularly arranged fixed pile, namely, the obliquely inserted fixed pile 11 may bear and disperse a larger impact force of the water flow.

In the embodiment, the assembly platform 1 of the tidal current energy power generation apparatus may totally include six fixed piles 11, three fixed piles 11 being located on the left side of the horizontal axis hydro-generator 2 and the other three fixed piles 11 being located on the right side of the horizontal axis hydro-generator 2. The three fixed piles 11 located on the left side or the right side are successively arranged along the water flow direction D. The specific quantity of the fixed piles 11 is not defined in the present invention. In other embodiments, the quantity of the fixed piles may be 4, 8 or 12. By arranging more fixed piles 11, the impact force brought by the water flow to the horizontal axis hydro-generator 2 may be transferred to more fixed piles 11, and thus, the impact force of the water flow may be dispersed more effectively, so that the whole tidal current energy power generation apparatus may bear and resist a larger thrust of the water flow, and therefore, the capacity of the assembly platform 1 to bear the single horizontal axis hydro-generator 2 in a larger scale is further improved. In other words, the assembly platform 1 provided by the embodiments of the present invention may support the horizontal axis hydro-generator 2 with a higher power, and the upper limit of powers of a single water turbine impeller and a single generator is improved, so that commercial popularization and application of the tidal current energy power generation apparatus are realized. In addition, with increase of the quantity of the fixed piles 11, the diameter of each fixed pile 11 may be reduced correspondingly, so that the section of the fixed pile 11 blocking the water flow is reduced, the utilization ratio of the water flow by the horizontal axis hydro-generator 2 is improved, and therefore, the power generation efficiency of the horizontal axis hydro-generator 2 is improved.

Specifically speaking, by taking an existing offshore wind power generation apparatus in the background art of the application as an example, the maximum single installed power capable of being borne by the apparatus is 5 MW, and it may be borne by the fixed piles, the maximum diameter of which is greater than 6 m. In the embodiment, the at least four fixed piles 11 and the supports 14 form a whole to disperse the thrust of the water flow. The diameter of each fixed pile is just 1.3 m, and the horizontal axis hydro-generator with the single installed power of 5 MW may be borne. Thus, the diameter of the fixed piles may be reduced greatly. The manufacturing difficulty and cost of each fixed pile are reduced correspondingly. In addition, a mounting process of fixing the single fixed pile to the seabed is quite tedious. In the mounting period, it is necessary to arrange a piling platform formed by a plurality of auxiliary piles around the single fixed pile, and after the single fixed pile is mounted and fixed, people and ships are sent to remove the auxiliary piling platform, and even underwater operations are involved, so that the mounting cost of the fixed piles are quite high. However, the embodiment uses the at least four fixed piles connected one another to form a natural piling platform. It is unnecessary to arrange the auxiliary piling platform additionally, so that the mounting cost of the fixed pile is lowered greatly. Thus, the sum of the manufacturing cost and the mounting cost of the four fixed piles with the diameter of 1.3 m is far lower than those of the fixed pile with the diameter of 6 m.

If the diameter of each fixed pile in the embodiment is made 3 m, the horizontal axis hydro-generator with the installed power reaching up to 20 MW may be borne, which breaks through the upper limit of the existing single installed power, thereby increasing the single installed power truly. The maximum single installed power of the existing tidal current energy power generation apparatus is only 2 MW. In order to achieve the generating capacity of 20 MW, it is necessary to operate ten horizontal axis hydro-generators and it is necessary to arranged at least ten assembly platforms to mount. For the tidal current energy power generation apparatus in the first embodiment of the present invention, it is only necessary to arrange one horizontal axis hydro-generator and one assembly platform to achieve the generating capacity of 20 MW, so that the cost is lowered greatly, and therefore, commercial application of the tidal current energy power generation apparatus becomes possible truly.

The cost of the tidal current energy power generation apparatus is substantially composed of two portions: the manufacturing cost and the mounting cost of the generator; and the manufacturing cost and the mounting cost of the assembly platform. For example, the manufacturing cost and the mounting cost of a 2.5 MW horizontal axis hydro-generator are 20000000 yuan, the manufacturing cost and the mounting cost of two 2.5 MW horizontal axis hydro-generators are 40000000 yuan, and the manufacturing cost and the mounting cost of one 5 MW horizontal axis hydro-generator are only 26000000 yuan. In other words, without considering the difference between the manufacturing cost and the mounting cost of the assembly platform, as far as the cost of the horizontal axis hydro-generator is concerned, the cost of per kilowatt-hour will be reduced greatly by operating the horizontal axis hydro-generator with a higher power. Needless to say, the manufacturing cost and the mounting cost of the assembly platform of the embodiment are far lower than those of the assembly platform in the prior art.

In the embodiment, the at least two sleeving members 12 are detachably sleeved on the main bearing piles on the left and right sides of the hydro-generator 2 and are located below the water surface p. In the embodiment, the assembly platform of the tidal current energy power generation apparatus has six fixed piles, the fixed pile 11 in the middle of the left column and the fixed pile 11 in the middle of the right column are main bearing piles, and the two sleeving members 12 respectively sleeve the main bearing piles on the left and right sides of the water flow direction. In the embodiment, the sleeving members 12 are round, and the specific structure of the sleeving members is not defined herein. In other embodiments, when the assembly platform of the tidal current energy power generation apparatus has eight fixed piles, the two fixed piles in the middle of the left column and the two fixed piles in the middle of the right column are main bearing piles, each of the sleeving members 12 may be of a double-ring structure, and the sleeving member 12 may sleeve the two main bearing piles at the same time.

In the embodiment, one ends of the at least two force-bearing supports 13 are respectively mounted on the left and right sides of the horizontal axis hydro-generator 2 along the water flow direction D and the other ends thereof are correspondingly provided with the sleeving members 12. In the embodiment, by taking the force-bearing support 13 located on the left side in FIG. 1 as an example, one end of the force-bearing support 13 refers to the right end and the other end of the force-bearing support 13 refers to the left end. In the embodiment, by taking the force-bearing support 13 located on the right side in FIG. 1 as an example, one end of the force-bearing support 13 refers to the left end and the other end of the force-bearing support 13 refers to the right end.

The force-bearing supports 13 and the sleeving members 12 in the embodiment are combined to resist the impact force of the water flow to the horizontal axis hydro-generator 2. Specifically speaking, as shown in FIG. 1, the water flow rushes at the horizontal axis hydro-generator 2 along the water flow direction D from bottom to top. As one ends of the two force-bearing supports 13 are respectively fixed to two sides of the horizontal axis hydro-generator 2, a thrust of the water flow to the horizontal axis hydro-generator 2 may be directly transferred and decomposed towards two sides. The thrust is successively arranged to each of the fixed piles 11 through the force-bearing supports 13, the sleeving members 12, the main bearing piles and the supports 14, and all the fixed piles 11 are stressed jointly. Meanwhile, as the sleeving members 12 are fixed to the main bearing piles, the sleeving members 12 are to generate a "resisting force" from top to bottom viewed from a direction shown in FIG. 1 to the force-bearing support 13, and effects generated among different forces are counteracted to achieve balance so as to further ensure stability of the horizontal axis hydro-generator 2 in water, so that the upper limit of the horizontal axis hydro-generator 2 capable of bearing the thrust of the water flow is improved.

In the prior art, the horizontal axis hydro-generator is fixed to the seabed through a single bearing pile, and the single bearing pile is to bear all the impact force of the water flow to the horizontal axis hydro-generator. In the process, a moment and a shearing force generated are quite large. In order to ensure that the bearing pile does not excess the load, the upper limit is arranged for the single installed scale of the horizontal axis hydro-generator. However, in the assembly platform of the embodiment, at least two stress points are arranged at a "waist" of the whole power generation apparatus, so that the impact of the water flow to the horizontal axis hydro-generator is dispersed transversely effectively. As the tidal current energy power generation apparatus generates electricity by means of kinetic energy of the water flow, the larger the thrust of the water flow is, the larger the generating capacity is. Therefore, the tidal current energy power generation apparatus of the embodiment may bear the horizontal axis hydro-generator with the higher power.

The sleeving members 12 and the main bearing piles of the embodiment may be fixed via a jack or fixed bolts. However, it is not defined herein. In another embodiment, the sleeving members 12 and the main bearing piles may realize interference fit. Specifically speaking, when the force-bearing supports 13 sleeve the main bearing piles, it is unnecessary to configure the jack or the fixed bolts to clamp the sleeving members 12 and the main bearing piles completely, and the two are fixed without being loosened. During mounting, it is also unnecessary for a mounting staff to enter underwater to mount correspondingly, so that it is unnecessary to arrange the person through pipe additionally.

In the embodiment, the quantities of the sleeving members 12 and the force-bearing supports 13 are two. However, it is not defined herein. In other embodiments, the quantities of the sleeving members and the force-bearing supports may both be four, and there may be two sleeving members and the force-bearing supports on the left and right sides of the horizontal axis hydro-generator along the water flow direction. In the embodiment, a length direction of the force-bearing support 13 is a direction perpendicular to the water flow direction D and parallel o the water surface P, so that not only can steel consumption of the force-bearing support 13 be reduced, but also can a moment generated by the force-bearing support 13 be reduced. However, it is not defined herein. In other embodiments, the length direction of the force-bearing support may be perpendicular to the water flow direction, but may not be parallel to the water surface, namely, the force-bearing support may be obliquely arranged. The more the force-bearing support 13 is arranged obliquely, the longer the length of the force-bearing support 13 is, and the larger the steel consumption is. The generated moment is increased, too. It is necessary to arrange the combining ends of the force-bearing supports 13 and the sleeving members 12 below the water surface.

In the embodiment, one ends of the two force-bearing supports 13 are directly mounted on a generator portion of the horizontal axis hydro-generator 2 and are located on the left and right sides. However, it is not defined herein. In other embodiments, the horizontal axis hydro-generator may be provided with the suspending support, one ends of the two force-bearing supports 13 may be mounted on the suspending support and are still located on two sides of the horizontal axis hydro-generator 2. In other words, one ends of the force-bearing supports are directly or indirectly mounted on the horizontal axis hydro-generator 2 so as to decompose the force of the horizontal axis hydro-generator 2 towards two sides. Preferably, the closer the positions of the two force-bearing supports 13 fixed to two sides of the horizontal axis hydro-generator 2 from the horizontal axis hydro-generator are, the better the effect is. The decomposing and transferring forces are weaker on action if the positions are farther, and meanwhile, the moment generated by the suspending support is increased.

In an actual mounting process, the horizontal axis hydro-generator 2, the force-bearing supports 13 and the sleeving members 12 are welded and fixed ashore and are assembled to form an internal module. Prototypes of the fixed piles 11 and the supports 14 are welded and fixedly connected ashore, and then they are transferred to a mounting water area, and the four fixed piles 11 are piled to further complete mounting of the assembly platform 1. The internal module is then hung in the installation space 15 of the assembly platform 1 from top to bottom from the water surface, and then the sleeving members 12 and the main bearing piles are fixed, i.e., the whole tidal current energy power generation apparatus is mounted. In the embodiment, all manufacturing and mounting actions of the tidal current energy power generation apparatus and the assembly platform thereof may be completed above the water surface, so that underwater operation is avoided, the construction difficulty is reduced, the safety of construction staff is improved, and the construction and mounting costs are further lowered greatly.

With respective to how to fix each fixed pile 11 in the embodiment to the seabed F, a piling way disclosed by another Chinese patent (the publication number CN105401564) invented by the inventor may be used and other existing piling ways may be used, which is not described in detail herein. However, it is not defined herein. It is to bed noted that the piling way of the fixed pile in the embodiment may be identical to that disclosed in the CN105401564. The structure and the mounting way of the whole tidal current energy power generation apparatus are essentially different from those disclosed in the CN105401564.

First, the horizontal axis hydro-generator in the CN105401564 invented by the inventor is installed inside an internal frame, and then the internal frame is inserted into an external frame. The steel consumption is increased greatly as the internal frame and the external frame are arranged, so that the cost is increased greatly. After the tidal current energy power generation apparatus invented by the inventor previously is put into actual application, the inventor finds that the thrust generated by the water flow is huge and unimaginable, and the thrust reaching up to 2000-3000 tons of force may be generated to the maximum extent. Therefore, the thrust of the water flow to the hydro-generator is counteracted by means of friction caused by gravity by increasing the weight of the internal frame. The embodiment fully abandons use of the frame. Except that a small amount of reinforcement cages are needed in a process of pouring concrete to form the fixed piles and steel is used in the force-bearing supports, the sleeving members and the supports, in the whole assembly platform, steel is not needed in other parts completely. The steel consumption of the whole assembly platform is reduced in a geometric level, so that the manufacturing cost is lowered greatly.

It is found by the inventor through actual application that by implementing the mounting method and structure invented by the inventor previously, for the horizontal axis hydro-generator with the single installed scale of 200 KW, the diameter of the impeller is 5.4 m and the section of the impeller is 22.9 m2. The hydro-generator will bear the thrust of 23 tons of forces of the water flow. At the time, the internal frame needs to reach up to more than 230 tons to guarantee safe operation of the hydro-generator. However, it is merely necessary to make the weight of the whole assembly platform of the tidal current energy power generation apparatus of the embodiment be 125 tons (it is actually only 25 tons of gravity in water if a buoyancy force generated by the hollow force-bearing supports, a hollow generator cabin and the like), so that the horizontal axis hydro-generator with the single installed scale of 1.5 MW may operate stably. The diameter of the impeller thereof is 15 m, the section of the impeller is 177 m2, and the hydro-generator will bear the thrust of 177 tons of force of the water flow. If the mounting method and structure invented by the inventor previously are adopted, it is necessary to bear the 1.5 MW horizontal axis hydro-generator with a frame reaching up to 1800 tons. The frame of the weight may not be realized fundamentally from the aspect of either technique or cost. Therefore, the problem of the frame limits enlargement of the existing single horizontal axis hydro-generator.

Second, the horizontal axis hydro-generators in CN105401564 are fixed to the uppermost side and the lowest side of the internal frame rotatably through a center rotating shaft. Under a huge thrust action of the water flow, the horizontal axis hydro-generators vibrate easily in the operating process. The larger the scale of the generator is, the more severe the vibration is. Components in the horizontal axis hydro-generator generate resonance as a result of severe vibration to be damaged. Therefore, after the tidal current energy power generation apparatus invented by the inventor previously is put into actual application, it is found that only 200 KW or 300 KW horizontal axis hydro-generator can operate safely by adopting the mounting way in CN105401564. If the single scale reaches over 1 MW, the horizontal axis hydro-generator is easily damaged, so that the single scale of the horizontal axis hydro-generator may not be broken through. However, at least two "restraining points" are arranged at the waist or near the waist of the horizontal axis hydro-generator of the tidal current energy power generation apparatus provided by the embodiment. The horizontal axis hydro-generator is fixed to the force-bearing supports directly and firmly, then the force-bearing supports are further fixed with the sleeving members firmly, and the sleeving members and the supports are of fixed relations with the fixed piles firmly. In other words, the horizontal axis hydro-generator and the assembly platform are of a firm fixed relation, and no components vibrate beyond a safe range in water, so that the problem of resonance is avoided. Therefore, the tidal current energy power generation apparatus provided by the embodiment may operate the horizontal axis hydro-generator of a larger installed scale stably.

In the embodiment, in order to reduce damage of ocean foreign matters (for example, ocean garbage or floating ice) to the horizontal axis hydro-generator 2 effectively, it is necessary to arrange barriers on the upstream and downstream sides of the horizontal axis hydro-generator 2. As a result of much ocean garbage, it is necessary to clean surface garbage periodically after the barriers are used for a period of time, so that it is ensured that the water flow swarms into the horizontal axis hydro-generator 2 smoothly all the time without being blocked by garbage, and therefore, the power generation efficiency is guaranteed. In addition, as the water flow is rapid and some garbage is relatively sharp, even if the barriers are manufactured by steel wires, the barriers are still be damaged, so that it is necessary to maintain and replace the barrier frequently. Staffs to clean, mount and maintain the barriers in the prior art must dive in water, so that the operating difficulty is high and the efficiency is low. Furthermore, as water flow collision around the tidal current energy generator causes a vortex easily, it is also dangerous to maintain and clean the generator.

In the embodiment, the assembly platform 1 further includes at least two groups of barrier guide slots 16 for mounting or fixing the barriers, the two groups of barrier guide slots 16 are respectively formed in upstream and downstream sides of the horizontal axis hydro-generator 2 (if the water flow direction is shown in D in FIG. 1, the lower side of FIG. 1 is upstream and the upper side of FIG. 1 is downstream), and each group of barrier guide slots 16 is led to a position below the water surface from a position above the water surface. In the embodiment, each group of barrier guide slots 16 includes two barrier guide slots, one group of the barrier guide slots 16 is located on one side of the upstream of the upstream two fixed piles 11 (the two lowest fixed piles in FIG. 1) in FIG. 1 and the other group of barrier guide slots 16 is located on one side of the downstream of the downstream two fixed piles 11 (the two uppermost fixed piles in FIG. 1) in FIG. 1. In an actual application, the left and right side edges of the barriers may be inserted into the barrier guide slots 16 from top to bottom along one group of barrier guide slots 16 and then slide to the bottom end dependent on the gravity themselves, thereby completing mounting and fixation of the barriers. By arranging the barrier guide slots 16, it is simpler to mount the barriers. It is unnecessary to perform the mounting operation in a sea, and sea surface operations are performed directly to mount the barriers. In particular, when it is necessary to clean or replace the barriers, the barriers may be pulled out from bottom to top along the barrier guide slots 16, and staffs only need to operate on the water surface. Therefore, the barrier guide slots 16 are arranged, so that is further convenient to clean and replace the barriers. By arranging the barrier guide slots 16, the costs of mounting, maintaining and replacing the barriers are lowered. The specific types of the barriers are not defined herein.

In the embodiment, the assembly platform 1 includes at least one personnel passage 17, and the at least one personnel passage 17 is led to a position below the water surface from a position above the water surface, so that a person may arrive the position below the water surface through the personnel passage 17 to perform maintaining or fixing operations. In the embodiment, there are two personnel passages 17, and the two personnel passages 17 are respectively located in the main bearing piles on two sides of the horizontal axis hydro-generator 2. The staffs arrive below the water surface through the personnel passages 17 to mount and fix the sleeving members 12 and the main bearing piles. In the embodiment, concrete is poured into a lower portion of the main bearing pile, and an upper portion of the main bearing pile is hollow, so that the person may arrive a position below the water surface through the main bearing pile to mount and fix the main bearing pile and the sleeving member. In other words, the upper hollow main bearing pile plays a role of the personnel passage 17, so that it is unnecessary to arrange a specific pipeline as the personnel passage 17 and it is necessary to arrange a ladder stand in the main bearing pile. The staffs may enter underwater through the ladder stand inside to arrive a fixed position of the main bearing pile and the sleeving member 12 so as to perform a fixing operation (for example, adjust a fixed bolt and the like). It is not defined in the present invention, and in other embodiments, the personnel passages 17 may be arranged externally along the main bearing piles.

In the embodiment, the assembly platform 1 further includes at least one air blower 181 and a ventilation duct 182. The ventilation duct 182 is fixedly or detachably arranged along an inner side of the personnel passage 17 or an outer side of the personnel passage 17, and the ventilation duct 182 is led to a position below the water surface from a position above the water surface P, so that a working area below the water surface P may be ventilated. The existing tidal current energy power generation apparatus has no regard for an underwater mounting or maintaining condition. The inventor has considered underwater maintenance but ignored the problem that toxic and harmful gases are generated and the concentration of carbon dioxide is high as a result of high temperature generated by heating of the machine because the machine inside operates for a long time. If it is necessary to perform the underwater operation, the staffs need to stay underwater for a long time, and conditions such as anoxia or carbon dioxide poisoning are prone to occurring. The air blower 181 and the ventilation duct 182 of the embodiment form a fresh air system, which guarantees the life safety of maintenance staffs or mounting staffs entering underwater. When the staffs need to enter the working area underwater to work, the air blower may be started to ventilate the working area below the water surface. In a specific application, the fresh air system has a more complex structure, for example, a blowing system and an exhausting system that are independent, which is not described in detail herein.

In the embodiment, the assembly platform 1 further includes at least one water pump 183 and at least one drain pipe 184. The drain pipe 184 is fixedly or detachably arranged along the inner side of the personnel passage 17 or the outer side of the personnel passage 17, the drain pipe 184 is led to a position below the water surface P from a position above the water surface P, and the water pump 183 pumps accumulated water in the working area below the water surface and discharges the water above the water surface through the drain pipe 184. As most of the whole tidal current energy power generation apparatus is located in water, after long-time operation, a seal ring is prone to loosening, so that it is hard to guarantee a condition that the seal ring is a leak. If there are no protection measures and the maintenance staffs or the mounting staffs enter the underwater working area from the personnel passages 17, they may have a life risk. By arranging the water pump 183 and the drain pipe 184, the life safety of the staffs is guaranteed greatly. In the embodiment, before the staffs need to work underwater, the water pump 183 is started to operate for a period of time first, and whether accumulated water is discharged or not from the drain pipe 184 is observed. Only there is no obvious accumulated water discharged from the drain pipe 184, can the staffs enter the personnel passages 17. When the staffs work underwater, the water pump 183 keep working all the time until the staffs finish work and return above the water surface. However, the working form of the water pump is not defined herein. In other embodiments, the water pump 183 may operate periodically to extract accumulated water inside and discharge the accumulated water above the water surface through the drain pipe 184 so as to prevent the accumulated water from damaging components, and the life safety of the staffs is guaranteed. In the embodiment, the ventilation duct 182, the drain pipe 184 and the personnel passages 17 may be located in the fixed piles 11. However, it is not defined herein. In other embodiments, specific ventilation duct 182, drain pipe 184 and personnel passages 17 are arranged externally along the fixed piles 11 and are led to a position above the water surface to a position below the water surface.

In the embodiment, a side of each column of the fixed columns 11 facing the horizontal axis hydro-generator 2 is provided with a side plate 19. The side plate 19 may form a water channel to play a rectifying role, namely, gather the water flow to guide the horizontal axis hydro-generator 2, thereby improving the power generation efficiency. In another embodiment, side plates may be arranged on upper, lower, left and right sides of the horizontal axis hydro-generator 2 so as to form the water channel to guide water to rush at the horizontal axis hydro-generator 2 in a centralized manner.

As shown in FIG. 2, in the embodiment, an area of each fixed pile 11 of the assembly platform 1 above the lowest water level L is provided with a concrete protection apparatus 111 to prevent each fixed pile 11 from not being corroded highly by an intertidal zone, so that the service life of the fixed pile 11 is prolonged greatly, the service life of the assembly platform 1 is therefore prolonged, and the maintenance frequency and cost are reduced. As water plays a role of isolating oxygen in air, the underwater portion of the fixed pile 11 is not easily corroded, and the portion of the fixed pile 11 located above the water surface is, on the contrary, corroded most likely. If the concretion protection apparatus is not arranged, once the portion of the fixed pile 11 above the water surface is corroded, a force between the fixed piles 11 is not transferred uniformly, which may probably cause unbalance and even collapse of the whole assembly platform 1. By arranging the concrete protection apparatus 111, the service life of the whole assembly platform 1 may be prolonged by 50 years. Following the rising tide and the falling tide, the height of the water surface P will be changed, so that the lowest end of the concrete protection apparatus 111 is preferably arranged at the lowest water level L. In an actual application, the lowest end of the concrete protection apparatus 111 may be lower than the lowest water level L. In a specific application, an area of the fixed pile 11 located above the lowest water level L is provided with a protecting cover, and then concrete is poured into the protecting cover to form the concrete protection apparatus 111.

In the embodiment, the assembly platform further includes a sealing device 185 and a fixing assembly 186. The fixing assembly 186 includes at least one fixing bolt and the sealing device 185 is correspondingly arranged at the fixing assembly 186. In a mounting process of the tidal current energy power generation apparatus of the embodiment, the horizontal axis hydro-generator 2, the at least two force-bearing supports 13 and the at least sleeving members 12 are welded and connected ashore to form the internal module. After the fixed pile 11 is driven to be fixed on the seabed F (including, but not limited to, drilling on the seabed, piling and embedding into a d-horizon and pouring concrete into the pile to form a reinforcing steel bar concrete pouring pile), the internal module is hung into the installation space 15 in water from top to bottom. Then, the staffs enter through the personnel passages 17 (the staffs enter along the internal ladder stands of the main bearing piles in the embodiment), and the sleeving members 12 and the main bearing piles are clamped by adjusting the fixing assembly 186 (for example, fastening the fixed bolt), so that the sleeving members 12 and the main bearing piles are fixed. So far, the whole internal module and the assembly platform 1 are fixed, and the whole tidal current energy power generation apparatus is mounted. However, it is not defined herein. In another embodiment, the person through pipes 17 may be led into the force-bearing supports 13, and then the staffs enter the force-bearing supports 13 to fix the sleeving members 12 and the main bearing piles through the sealing device 185 and the fixing assembly 186. In yet another embodiment, the sleeving members 12 and the main bearing piles are in clamping fixation, so that it is unnecessary to arrange the sealing device 185 and the fixing assembly 186.

In an actual manufacturing process, it is hard to guarantee that the dimensions of the inner diameters of the sleeving members are completely matched with the dimensions of the outer diameters of the main bearing piles. In the presence of tolerance, there will be gaps between the main bearing piles and the sleeving members 12. In order to avoid swing of the horizontal axis hydro-generator 2, mounting staffs may enter underwater through the personnel passages 17 to adjust the fixing assembly 186 (for example, fastening the fixed bolt), so that the sleeving members 12 are firmly locked to the outer walls of the fixed piles 11, and thus, swing of the horizontal axis hydro-generator 2 is avoided. Regardless of the rising tide and the falling tide, the horizontal axis hydro-generator 2 will be firmly positioned without an oscillation phenomenon exceeding an acceptable range. In the process, the air blower 181 works all the time to blow fresh air from the ventilation duct 182. Further, the water pump 183 may work all the time too to discharge probable accumulated water from the discharge pipe 184, so that the life safety of the staffs is guaranteed. When it is necessary to hang the horizontal axis hydro-generator 2 out of the water, the fixing assembly 186 may be loosened, so that a fixing relation between the horizontal axis hydro-generator 2 and the main bearing piles is relieved, thereby achieving separable mounting and fixing of the horizontal axis hydro-generator 2.

In the embodiment, the tidal current energy power generation apparatus further includes one suspending support 31 of an airtight hollow structure, and one end of the suspending support 31 is communicated with the horizontal axis hydro-generator 2, so that the staffs enter the horizontal axis hydro-generator 2 through the suspending support 31 and the other end of the suspending support 31 is led to a position above the water surface F. As the suspending support 31 is of the airtight hollow structure, the ladder stand may be arranged in the suspending support 31. The staffs may enter the horizontal axis hydro-generator 2 through the ladder stand in the suspending support 31 to work (for example, maintenance work such as replacing the seal ring and replacing engine oil or arranging work of a pipeline). When the horizontal axis hydro-generator 2 fails, the staffs may enter the horizontal axis hydro-generator 2 for maintenance without hanging the horizontal axis hydro-generator 2 out of the water surface. The suspending support 31 in the tidal current energy power generation apparatus is correspondingly provided with the air blower 181, the ventilation duct 182, the water pump 183 and the drain pipe 184, thereby guaranteeing the life safety of the underwater staffs.

For most existing tidal current energy power generation apparatuses, the single bearing pile is arranged below the horizontal axis hydro-generator, and the mounting way has two apparent defects. The first defect is that a large single-scaled horizontal axis hydro-generator may not be borne and the power generation cost is high as the single bearing pile abovementioned will support all the thrusts of the water flow to the horizontal axis hydro-generator to lead to a too large moment and shearing force. The second defect is that if it is necessary to maintain the horizontal axis hydro-generator, it is necessary to dismount connection between the horizontal axis hydro-generator and the bearing piles by the staffs underwater and to hang the horizontal axis hydro-generator out of the sea level, so that the maintenance potential safety hazard is great. Furthermore, in order to ensure normal operation of the horizontal axis hydro-generator, the bearing piles and the horizontal axis hydro-generator are fixed quite firmly, which means that it is quite hard to relieve the connecting relation between the two, not to mention underwater operation, so that the maintenance difficulty is quite high. Therefore, many existing tidal current energy power generation apparatuses are not maintained. Once the horizontal axis hydro-generator is damaged (for example, water enters the horizontal axis hydro-generator as the seal ring which is used for a long time is loosened or engine oil of the horizontal axis hydro-generator is replaced and the like), the whole power generation apparatus is directly scraped. It is also one of the important reasons which make the service life of the existing tidal current energy power generation apparatus be short and the cost be high, so that the tidal current energy power generation apparatus may not be commercialized.

However, when it is necessary to maintain the horizontal axis hydro-generator 2 in the embodiment, the maintenance staffs may directly enter the horizontal axis hydro-generator 2 through the suspending support 31 for underwater maintenance. In the actual application, the service life of the assembly platform of the embodiment may reach 50 years. The upper limit of use of the horizontal axis hydro-generator is 20 years. When the horizontal axis hydro-generator 2 reaches the service life, it is only necessary to relieve fixed connection between the horizontal axis hydro-generator 2 and the assembly platform 1, namely, the horizontal axis hydro-generator 2 may be hung out of the water surface from the bottom to top from the water, and a new horizontal axis hydro-generator 2 is mounted. The horizontal axis hydro-generator 2 in the embodiment is mounted separably in a hanging upside down manner, and the maintenance cost and difficulty of the horizontal axis hydro-generator 2 are far lower than those of the horizontal axis hydro-generator directly fixed to the seabed.

The horizontal axis hydro-generator 2 in the embodiment is fixed underwater by the suspending support 31 and the force-bearing supports 13 on two sides, so that it is ensured that the horizontal axis hydro-generator 2 does not swing under the action of the huge thrust of the water flow, and generated vibration is within the safe range, too. Therefore, the tidal current energy power generation apparatus provided by the embodiment may operate the horizontal axis hydro-generator of a larger installed scale stably, which means that the single installed power of the horizontal axis hydro-generator is higher. The maximum single installed power of the existing tidal current energy power generation apparatus may be 2 MW. The tidal current energy power generation apparatus in the embodiment may bear and operate the horizontal axis hydro-generator with the single installed power of 5 MW, and even 10 MW and 20 MW. It promotes development of ocean energy power generation industry and progress of technology greatly, which brings a fundamental evolution to the industry.

Meanwhile, even the existing tidal current energy power generation apparatus uses the single installed power of 2 MW, it cannot generate electricity continuously as problems such as maintenance are not solved. Even if the maintenance problem is considered for a part of tidal current energy power generation apparatuses, the power generation cost of power generation by tidal current energy is far higher than that of power generation by other energy sources due to the high maintenance cost, and thus, the commercial value of the existing tidal current energy power generation apparatus is very small all the time. The suspending support in the embodiment plays a supporting role, and the staffs may enter the horizontal axis hydro-generator to maintain, so that the maintenance cost is lowered greatly.

In the embodiment, the large tidal current energy generating device further includes at least one connector 4, and the at least one connector 4 is transversely or vertically connected with one end of the suspending support 31 above the water surface and the assembly platform 1. When it is necessary to separate the horizontal axis hydro-generator 2 and the assembly platform 1, the connecting relation between the connector 4 and the assembly platform 1 is relieved, and the fixing assembly 186 is loosened, so that the horizontal axis hydro-generator 2 may be hung out of the water.

In another embodiment, the tidal current energy power generation apparatus may not be provided with the suspended supporting part, the two personnel passages 17 may be respectively communicated with the force-bearing supports 13. The two force-bearing supports 13 may be of hollow structures. The staffs may arrive in the horizontal axis hydro-generator 2 through the personnel passages 17 and the force-bearing supports 13 to perform maintaining operations (for example, updating engine oil, replacing a gear, replacing a sealing element and the like) in the horizontal axis hydro-generator 2. The ventilation duct 182 and the drain pipe 184 both may be communicated in the force-bearing support 13, and the ventilation duct 182 and the drain pipe 184 may be arranged along the hollow force-bearing support 13 to reach the inner side of the horizontal axis hydro-generator 2. However, it is not defined herein. In other embodiments, the assembly platform may be merely provided with one personnel passage, and the staffs may reach the force-bearing support on one side through the personnel passages to fix and mount the horizontal axis hydro-generator and may perform maintenance operations on the horizontal axis hydro-generator, and may fix and mount the sleeving member 12 and the main bearing pile located on the other side by passing through the force-bearing support on one side, the horizontal axis hydro-generator and the force-bearing support on the other side successively. In yet another embodiment, the assembly platform may be provided with a dedicated personnel passage which is communicated with the inner side of the horizontal axis hydro-generator directly.

Figure 3:
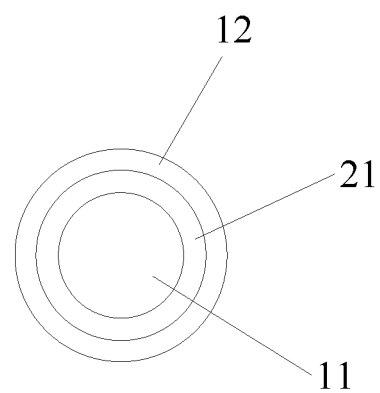
FIG. 3 is a partial schematic diagram of a large tidal current energy generating device provided according to a second embodiment of the present invention.

FIG. 3 is a partial schematic diagram of a large tidal current energy generating device provided according to a second embodiment of the present invention. The assembly platform, the horizontal axis hydro-generator, the fixed piles 11, the concrete protection apparatus, the sleeving members 12, the force-bearing supports, the supports, the installation space, the barrier guide slots, the personnel passages, the air blower, the ventilation duct, the water pump, the drain pipe, the side plates and the like in the second embodiment may be as same as corresponding elements in the first embodiment in structure and function. Description on differences is made below.

In the second embodiment, the assembly platform further includes at least two shock absorbers 21, and each of the shock absorbers 21 is arranged between the sleeving member 12 and the main bearing pile 11. The shock absorbers 21 may be made of special polyethylene macromolecular materials, rubber materials or springs and the like. By arranging the shock absorbers 21, resonance which may be generated by the horizontal axis hydro-generator may be reduced effectively.

Figure 4:
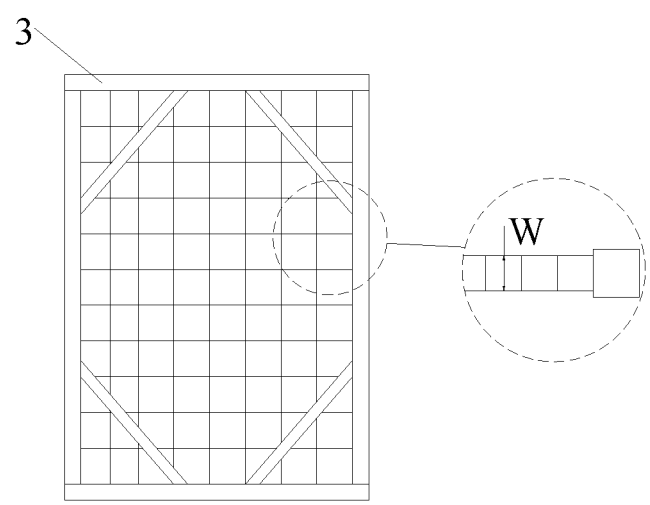
FIG. 4 is a schematic diagram of barrier of a large tidal current energy generating device provided according to a third embodiment of the present invention.

FIG. 4 is a schematic diagram of a barrier provided according to a third embodiment of the present invention. A right dotted line circle in FIG. 4 is a top view of an identifier of a left dotted line circle. The assembly platform, the horizontal axis hydro-generator, the fixed piles, the concrete protection apparatus, the sleeving members, the force-bearing supports, the supports, the installation space, the barrier guide slots, the personnel passages, the air blower, the ventilation duct, the water pump, the drain pipe, the side plates and the like in the third embodiment may be as same as corresponding elements in the first embodiment in structure and function. Description on differences is made below.

In the embodiment, the assembly platform includes at least two barriers 3 which are respectively arranged on upstream and downstream sides of the horizontal axis hydro-generator 2, a width W of each of the barriers 3 along a water flow direction being greater than or equal to 8 cm. An existing tidal current energy power generation apparatus often ignores damage caused by foreign matters in a sea (for example, ocean garbage, floating ice in the sea and the like) on the impeller of the hydro-generator. The inventor has noted that. By way of arranging the barriers, the probability that the ocean foreign matters are involved in the impeller is reduced. However, it is found through practice more than a year that if the barrier is the barrier formed by weaving steel wires, impacted by the water flow continuously, the joint of the steel wires rub with each other, and the thickness of the steel wires at the joint is reduced continuously. Finally, the steel wires are broken, so that the effect of the barriers that intercept the ocean foreign matters is lost. More important, the broken steel wires will be twisted into the impeller of the hydro-generator to damage the blades, which leads to damage of the whole horizontal axis hydro-generator. Therefore, the impeller is not protected, and the maintenance cost is raised accidentally. Therefore, as the width of the barrier 3 along the water flow direction is set to be greater than or equal to 8 cm, regardless of impact of the water flow, the barrier is no longer damaged. As a result of specialty in the field, the cost is hugely raised once the tidal current energy shaft horizontal axis hydro-generator is maintained or the component is replaced, which hinders commercial application of the tidal current energy power generation apparatus. Those skilled in the art often fall into a wrong region previously and consider the problem theoretically all the time but ignore the economic applicability of the power generation apparatus truly put into use. The parameter 8 cm is the parameter which is obtained by the inventor who draws lessons from the past through continuous practice accumulation and finally determines that the barrier is long enough.

In the embodiment, the height of each barrier grid along the water depth direction is still the diameter of the steel wire, namely, about 8 mm. In the actual application, the width W of the barrier 3 along the water flow direction may be 30 cm, which effectively prevents collision of ice in surrounding waters in the north of Canada and further ensures that the steel wires are not twisted. In the embodiment, the lengths of the barriers perpendicular to the water flow direction and parallel to the water surface are determined according to the dimension of the correspondingly mounted assembly platform, which is not defined herein, for example, it may be 15*20 m. The height of the barrier along the water depth direction is determined according to a stress condition of a water flow environment of an implementation place, which is not defined specifically herein. The screen of the barrier may be of a square or rhombus structure. The amplitude of the screen distance is not defined specifically herein, and the screen may be 30*30 cm. In addition, the patent does not define the specific material of the barrier supports and the blocking net.

All features in all the embodiments mentioned in the application may be combined and used freely according to actual conditions. For example, the barriers in the third embodiment may be applied to the tidal current energy power generation apparatus of any one of first or second embodiment, and the barriers in the third embodiment may further be applied to any existing tidal current energy power generation apparatus. The tidal current energy power generation apparatus of any one of first or second embodiment may adopt barriers of other structures. The tidal current energy power generation apparatuses in the first embodiment to the third embodiment may be provided with one or more horizontal axis hydro-generators in a water depth direction.

What is claimed is:

1. An assembly platform of a large tidal current energy generating device, wherein at least one horizontal axis hydro-generator is installed inside the assembly platform, and the assembly platform of the large tidal current energy generating device comprises:

supports;

at least four fixed piles, wherein the at least four fixed piles are connected by the supports to form an installation space, the at least one horizontal axis hydro-generator is installed inside the installation space, one end of each of the at least four fixed piles is driven to be fixed to a seabed, the other end of each of the at least four fixed piles extends to be above a water surface, the at least four fixed piles are arranged in left and right columns along a water flow direction, at least two fixed piles in each column are arranged in sequence along the water flow direction, and at least one of the at least two fixed piles in each column acts as a main bearing pile;

at least two sleeving members, wherein the at least two sleeving members are detachably sleeved on the main bearing pile on left and right sides of the at least one horizontal axis hydro-generator and are located below the water surface, respectively; and at least two force-bearing supports, wherein ends of the at least two force-bearing supports are respectively mounted on the left and right sides of the at least one horizontal axis hydro-generator along the water flow direction, and other ends of the at least two force-bearing supports are respectively mounted with corresponding sleeving members so as to resist an impact force of a water flow on the at least one horizontal axis hydro-generator.

2. The assembly platform of the large tidal current energy generating device according to claim 1, wherein the assembly platform further comprises at least two groups of barrier guide slots for mounting or fixing barriers, the at least two groups of barrier guide slots are arranged on upstream and downstream sides of the at least one horizontal axis hydro-generator, respectively, and each group of the barrier guide slots is led to a position below the water surface from a position above the water surface.

3. A large tidal current energy generating device, comprising
the assembly platform as claimed in claim 2;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

4. The assembly platform of the large tidal current energy generating device according to claim 1, wherein the assembly platform further comprises at least one personnel passage, one end of the at least one personnel passage is led to be above the water surface, and the other end is led to be below the water surface, enabling people to reach below the water surface to install and fix the main bearing piles and the sleeving members.

5. The assembly platform of the large tidal current energy generating device according to claim 4, wherein the assembly platform further comprises at least one air blower and a ventilation duct, the ventilation duct is fixedly or detachably arranged along an inner side or outer side of the personnel passage, the ventilation duct passes from above the water surface to below the water surface to enable air in a working area to be exchanged under the water surface.

6. A large tidal current energy generating device, comprising
the assembly platform as claimed in claim 5;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

7. The assembly platform of the large tidal current energy generating device according to claim 4, wherein the assembly platform further comprises at least one water pump and at least one drain pipe, the at least one drain pipe is fixedly or detachably arranged along an inner side or outer side of the personnel passage, the at least one drain pipe passes from above the water surface to below the water surface, such that the water pump pumps accumulated water in the working area under the water surface to discharge the water to be above the water surface by the drain pipe.

8. A large tidal current energy generating device, comprising
the assembly platform as claimed in claim 7;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

9. A large tidal current energy generating device, comprising
the assembly platform as claimed in claim 4;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

10. The assembly platform of the large tidal current energy generating device according to claim 1, wherein concrete is poured into a lower portion of the main bearing pile, and an upper portion of the main bearing pile is hollow, such that people may reach below the water surface through the main bearing pile to mount and fix the main bearing pile and the sleeving members.

11. A large tidal current energy generating device, comprising
the assembly platform as claimed in claim 10;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

12. The assembly platform of the large tidal current energy generating device according to claim 1, wherein the assembly platform further comprises at least one suspending support, the suspending support is an airtight hollow structure, and one end of the suspending support is communicated with the horizontal axis hydro-generator, such that people enters into the horizontal axis hydro-generator through the suspending support, and the other end of the suspending support is led to be above the water surface.

13. A large tidal current energy generating device, comprising
the assembly platform as claimed in claim 12;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

14. The assembly platform of the large tidal current energy generating device according to claim 1, wherein the assembly platform further comprises a sealing device and a fixing assembly, the fixing assembly is configured to fix the main bearing piles and the sleeving members, and the sealing device is correspondingly disposed at the fixing assembly.

15. A large tidal current energy generating device, comprising
the assembly platform as claimed in claim 14;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

16. The assembly platform of the large tidal current energy generating device according to claim 1, wherein the assembly platform further comprises at least two shock absorbers, and each of the shock absorbers is arranged between the sleeving member and the main bearing pile.

17. A large tidal current energy generating device, comprising
the assembly platform as claimed in claim 16;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

18. A large tidal current energy generating device, comprising
the assembly platform as claimed in claim 1;
at least one horizontal axis hydro-generator, separably installed inside the assembly platform; and
at least one suspending support, the at least one suspending support is an airtight hollow structure, one end of the suspending support is communicated with the at least one horizontal axis hydro-generator, enabling people to enter into the at least one horizontal axis hydro-generator through the suspending support, and the other end of the suspending support is led to be above the water surface.

* * * * *